(12) United States Patent
Sik Kim

(10) Patent No.: US 11,597,266 B1
(45) Date of Patent: Mar. 7, 2023

(54) APPARATUS AND SYSTEM FOR VEHICLE PROPULSION

(71) Applicant: Dae Sik Kim, Newton, MA (US)

(72) Inventor: Dae Sik Kim, Newton, MA (US)

( * ) Notice: Subject to any disclaimer, the term of this patent is extended or adjusted under 35 U.S.C. 154(b) by 0 days.

(21) Appl. No.: 17/456,481

(22) Filed: Nov. 24, 2021

(51) Int. Cl.
*B60K 6/00* (2006.01)
*F02B 65/00* (2006.01)

(52) U.S. Cl.
CPC .............. *B60K 6/00* (2013.01); *F02B 65/00* (2013.01)

(58) Field of Classification Search
CPC ................................ B60K 6/00; F02B 65/00
USPC ........................................................ 180/302
See application file for complete search history.

(56) References Cited

U.S. PATENT DOCUMENTS

| | | | |
|---|---|---|---|
| 1,024,079 A | 4/1912 | Jennings | |
| 2,086,553 A | 7/1937 | Holzwarth | |
| 2,162,967 A | 6/1939 | Pateras | |
| 2,277,471 A | 3/1942 | Wydler | |
| 3,007,302 A | 11/1961 | Vincent | |
| 3,237,421 A | 3/1966 | Gifford | |
| 3,350,920 A | 11/1967 | Hans | |
| 3,444,686 A | 5/1969 | Knowles | |
| 3,513,929 A | 5/1970 | Kim | |
| 3,549,278 A | 12/1970 | Giddings | |
| 3,641,767 A | 2/1972 | Kraus et al. | |
| 3,643,425 A | 2/1972 | Kraus et al. | |
| 3,643,640 A | 2/1972 | Kraus et al. | |
| 3,672,160 A | 6/1972 | Kim | |
| 4,478,304 A * | 10/1984 | Delano | B60K 6/12 180/165 |
| 5,547,640 A | 8/1996 | Kim | |
| 5,560,350 A | 10/1996 | Kim | |
| 5,632,210 A | 5/1997 | Kim | |
| 2010/0296949 A1* | 11/2010 | Corley | F04B 9/1095 60/407 |

* cited by examiner

*Primary Examiner* — John D Walters
(74) *Attorney, Agent, or Firm* — Greenberg Traurig, LLP; Chinh H. Pham; Jose R. Vento

(57) ABSTRACT

The present invention relates to an ultra-low emission stored exhaust gas-assisted internal combustion powerplant. The powerplant comprises a variable torque drive turbine connected to a piston compressor through a gearbox. The gearbox comprises a planetary or epicyclic gear to selectively direct power from the drive turbine to the compressor and at least one output shaft. The compressed air is mixed with fuel in a staged combustor, the hot exhaust gasses are used to drive the variable torque drive turbine or cooled and stored in a exhaust gasses storage system.

18 Claims, 5 Drawing Sheets

APPARATUS AND SYSTEM FOR VEHICLE PROPULSION

FIELD OF THE INVENTION

The present invention relates to propulsion systems for vehicles and, in particular, to a stored exhaust gas-assisted internal combustion powerplant. In an aspect, the present invention relates to powerplants having prime movers utilizing hot expanding gasses.

BACKGROUND

Current efforts in the field of vehicle propulsion have largely centered on incrementally improving the efficiency of internal combustion engines—to limited success—and developing new energy storage sources for use in electric vehicles—with equally marginal gains.

Fundamentally, traditional internal combustion engines or powerplants ("ICEs" or "ICPs," respectively) present significant areas of inefficiency. For example, to avoid repeated wasteful restarts, an ICP is usually idled when no work is being done. However, prolonged idle times (more than a few seconds) also lead to fuel consumption with no return on the expenditure. ICPs are equally inefficient in the ramp up (i.e., at low revolutions per minute or "RPM") to operating speeds. Some components of ICPs store a portion of the unused energy (i.e., flywheels that store energy and help sustain smooth idling) but add additional dead weight.

In a conventional directly driven peak power system, the engine must convert the portable energy (i.e., fuel) into large peak shaft power every time, rather than using a peak size prime mover. The engine and the transmission must be large enough to meet the peak transient requirements and the losses while under way. Since the operational range of speed and torque of an engine differ from those of the vehicle, an interface is required which modifies and transmits the power as needed. Although modern automatic transmissions with torque converters eliminated the manual clutching and shifting of manual transmissions, the rapid transients of the engine during acceleration and deceleration were not eliminated. Conversions of the rotational power into viscous fluid power in addition to losses to viscous flow in torque converters waste energy.

The evolution of ICPs over the last century can best be described as displacement centric—increasing the displacement of the engine to boost peak power and gain better acceleration performance. Increased displacement has further exacerbated intrinsic ICP design issues as more severe transients are introduced to the combustion reaction, harmful emissions are increased, additional frictional losses are introduced, and more parts are required adding dead weight the ICP. Improvements with marginal efficiency gains have been developed to improve the performance and decrease fuel consumption.

Other improvements have focused on forced induction and valve control. For example, turbochargers, superchargers, multiple valves, and complex valve timings have been added with little effect. Each of these approaches have required increasingly more complex systems to enable reliable operation and obtain the desired performance metrics in addition to more involved materials, higher tolerances, and increased overall weight. As a result, the initial cost and maintenance costs of ICPs has significantly increased to only marginal efficiency and power gains. Progressively stringent regulatory requirements have also added hardware and operational complexity to ICPs.

Electric vehicles in general present equally significant levels of inefficiency. Electric propulsion systems, in particular, present at least four major drawbacks when compared to hydrocarbon-based propulsion systems. First, the electro-chemical reaction within electric batteries occurs in the two-dimensional electrodes/electrolyte interphases and the rates of ion and mass transports to and from the surfaces are finite. Second, electron flow needs metal conductor and magnetic flux needs metal core to push or pull. Third, electric batteries must carry all reactants, reaction products, electrodes, and electrolyte in a safe container at all times. These components represent dead or added weight not found in embodiments described herein. And, finally, electric batteries have comparatively larger charge times and must be charged from truly sustainable reliable sources (e.g., Batch Thermo-Nuclear Reaction).

Some solutions to these problems were discussed in U.S. Pat. No. 3,672,160. However, the systems disclosed therein were mechanically complex and required fuels with very high octanes to be implemented in a practical manner. A primordial need remains for a vehicle propulsion system that leverages the large energy capacity of hydrocarbons while significantly mitigating harmful emissions and limiting the operational complexity of the system. The present invention is directed toward solutions that address this need, in addition to having other desirable characteristics.

SUMMARY

In accordance with example embodiments of the present invention, a stored exhaust gas-assisted internal combustion powerplant with ultra-low emissions is provided. The powerplant comprises a variable torque drive turbine (i.e., the prime mover) connected to a compressor (i.e., the power sink) through a gearbox. A gearbox comprises a planetary or epicyclic gear to selectively direct power from the drive turbine to the compressor and at least one output shaft. A sun gear of the planetary gear system is connected to and driven by the variable torque drive turbine. A ring gear of the planetary gear is connected to and turns the compressor—which may be a piston compressor. A carrier gear is connected to a mechanism for effecting movement in a vehicle such as wheels or propellers (i.e., the output). A compressor intakes ambient air, compresses it, and stores it in a volume within the compressor. Compressed air is directed to a staged combustor, mixed with fuel vapor, and ignited, creating exhaust gasses thereby. In some embodiments, a staged combustor supports a staged combustion process including combustion of a rich fuel mixture followed by combustion of a lean fuel mixture with no droplets. Exhaust gasses from the combustion may be routed to the drive turbine to effect movement on an impeller of the drive turbine. The exhaust gasses may also be routed to a cooled exhaust gasses storage system ("CEG storage system"). Hot exhaust gasses can be cooled by a ceramic honeycomb element before being stored in storage tanks. In some embodiments, the cooled exhaust gasses may be reheated by the ceramic honeycomb element.

Example embodiments of the present invention eliminate many of the parts (e.g., starter, transmission, torque converter, intake/exhaust systems, valve train, and accessories), processes (e.g., combustion in the cylinders, idling and throttling), and entropic losses (e.g., cooling, pumping and viscous dissipation) of traditional ICEs. Further, example embodiments of the present invention improve control, mileage, emission, safety, and performance of the vehicle with fewer moving parts, less weight, and less costs. It will be noted that example embodiments of the present invention need no separate working medium for the energy storage. Stored exhaust gasses can provide increased peak power for acceleration in a car or at take-off in an aircraft when compared to existing ICPs.

Example embodiments of the present invention can achieve output brake horsepower nearly proportional to the operating RPM of the compressor. Some example embodiments can achieve more than double horsepower than comparable ICEs (e.g., four stroke ICEs). Other example embodiments provide for piston compression of over 20 bar for a wider speed range. In some example embodiments, a drive turbine with high stall torque responds faster than prime movers found in the prior art. Some example embodiments can achieve further horsepower or thrust increases by injecting more fuel to the hot exhaust gasses before or/and after the turbine (e.g., afterburning).

In accordance with example embodiments of the present invention, a turbine driven powerplant is provided. The powerplant comprises a compressor with a block (e.g., a short block) similar in size and arrangement to an engine block of an inline four internal combustion engine. Other parts, such as the piston rods and the crankshaft are also similar in size and design as piston rods and crankshafts in contemporaneous ICEs. However, other traditional parts of ICEs are not necessary. An aspect of the present disclosure is a substantially flat cylinder cover/head comprising intake tapered disk valves and flat piston heads with tapered disk valves. Piston heads with tapered disk valves may allow for the flow of compressed air from a compression chamber to a crankcase of a compressor block.

In accordance with example embodiments of the present invention, a CEG storage system is provided to lower the temperature of exhaust gasses and store the gasses for use during operation or at start. The cool stored exhaust gas and/or the compressed air can also be used in other parts of the vehicle. For example, the stored gasses may be used to inflate safety air bags without the need for exploding sodium azide. Stored gasses may also be used to steer and brake the vehicle or in an air-conditioning system (e.g., by simple expansion). Stored gasses may be used to concentrate Oxygen in an aircraft without costly hardware or idle losses. In some example embodiments, by positioning tanks of the CEG storage system within a bumper of a vehicle, damage can be minimized in the event of a collision. Stored air may also be used to power air tools on job sites. In some example embodiments of the present invention, the distributed storage tank(s) may be partitioned for an emergency reserve set-aside or for finer control of vehicle dynamics or ICP performance.

In accordance with example embodiments of the present invention, an operator of a vehicle powered by a disclosed propulsion system, directly controls the torque of the drive turbine. Unlike in Brayton cycle engines, where the injected fuel controls the turbine inlet temperature and the output power. In some example embodiments, a portion of the torque may automatically power the compressor to maintain operating pressure as need and to maintain the CEG storage system full. The compressor may be disengaged when the tanks in the CEG storage system are full.

In some example embodiments of the present invention, the inlet turbine temperature may be set to approximately 2K degrees Fahrenheit to avoid NOx formation and the need for expensive high temperature metals. In still other example embodiments, pressure is one operating variable of the storage system and is optimized by an on-board computer based on the speed of the turbine, the compressor, the wheels or propeller, the ambient conditions, and the road or flight conditions.

In some example embodiments of the present invention, to reduce emissions, the powerplant may use a pre-vaporized fuel in the staged-combustion process (e.g., rich then lean mixture) to keeps the top local temperature near that of the turbine inlet and avoid formation of particulates or NOx. Some example embodiments of the present invention can use any fuel capable of being vaporized and has no Octane nor Cetane requirements.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
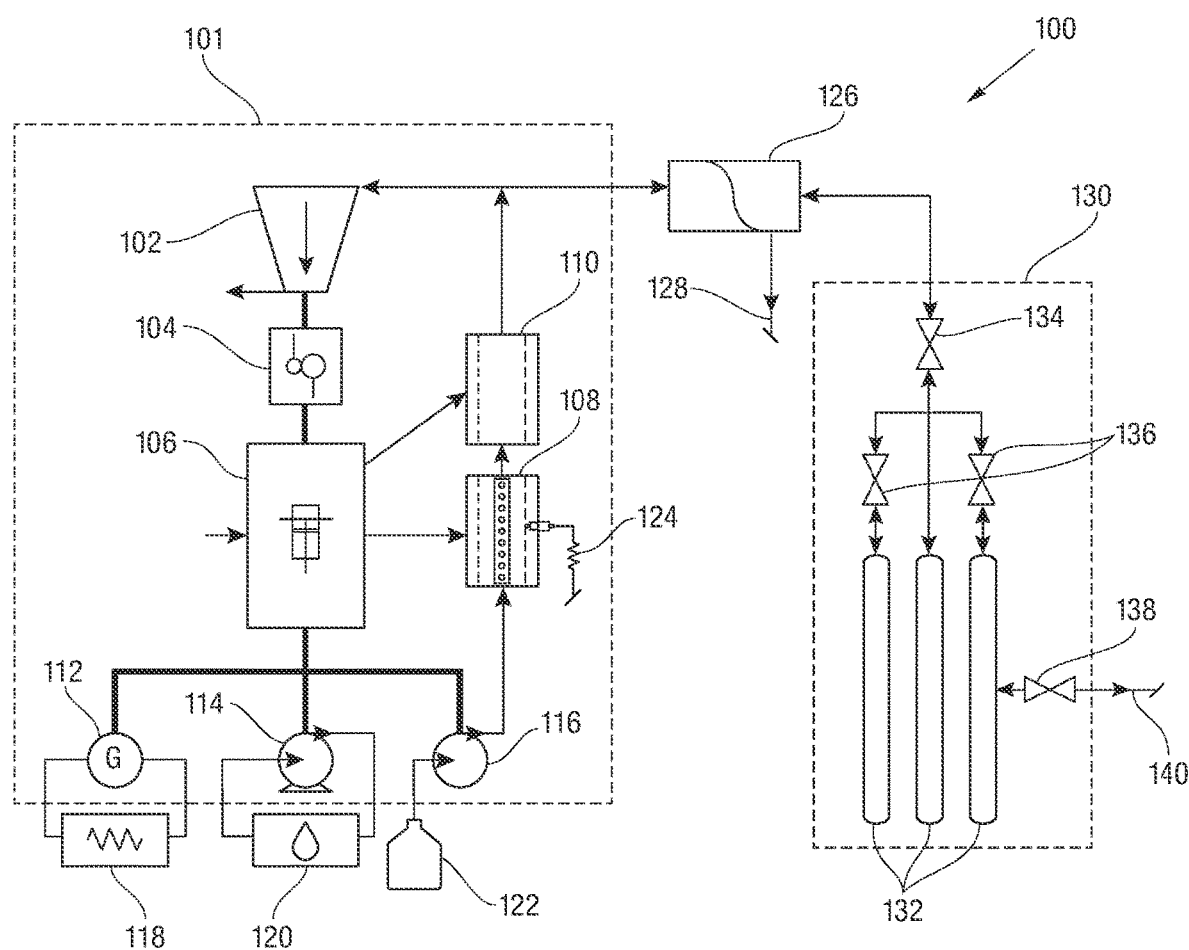
FIG. 1 is a schematic diagram of a propulsion system according to an embodiment of the present invention.

FIGS. 1 through 6, wherein like parts are designated by like reference numerals throughout, illustrate an example embodiment or embodiments of a propulsion system for use in vehicles. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 is a schematic diagram of a propulsion system 100 according to an embodiment of the present invention. In some embodiments of the present invention, a propulsion system includes a powerplant 101 and a CEG storage system 130. In other embodiments, the propulsion system 100 may include components such as gearboxes, transmissions, and differentials to integrate the powerplant into the specific application (i.e., a vehicle). In still other embodiments, the propulsion system may be part of a larger system including flight control surfaces, braking systems, steering systems, hydraulic systems, pneumatic systems, and electromechanical systems.

In an embodiment, a powerplant 101 includes a drive turbine 102 and a compressor 106 connected by a gearbox 104. During operation, the drive turbine 102 may be powered by hot exhaust gasses from combustor 108, described in further detail below. In some embodiments, the hot exhaust gas from the combustor 108 may be directed to the drive turbine 102 and CEG storage system 130 via a thermal storage 126. In an embodiment, the drive turbine 102 can be a variable torque drive turbine capable of operating over a wide range of rotor speeds. In some embodiments, the combustor 108 may be a primary combustor and the powerplant 101 may include a secondary combustor 110. In some embodiments, primary combustor 108 and secondary combustor 110 are elements of a staged combustor to support a staged combustion. In some embodiments, a staged combustion includes a rich fuel mixture and a lean fuel mixture.

Still referring to FIG. 1, in an embodiment, an output of the drive turbine 102 may be coupled to the gearbox 104. In one embodiment, an output of the gearbox 104 may drive the compressor 106. In some embodiments, gearbox 104 can include additional outputs coupled to the means to effect movement in the vehicle (i.e., wheels or propellers). In some embodiments, the gearbox 104 may include a planetary gear system to transfer power from the drive turbine 102 to the compressor 106 and the other outputs. Embodiments of gearbox 104 will be discussed in more detail with respect to FIGS. 3 and 4. In an embodiment, the gearbox 104 can provides for means of automatic transmission of power from the power source to the drive means. In some embodiments, during deceleration, the gearbox 104 may allow for regenerative braking by, for example, converting the vehicles kinetic energy during deceleration to drive the compressor 106. In some embodiments, the gearbox 104 may also allow for speed reduction between turbine rotor 216, operating at high revolutions per minute ("RPM"), and compressor 106, operating at comparatively lower RPMs.

In some embodiments, the compressor 106 may take in ambient air and compress it. In some embodiments, the ambient air compressed by the compressor 106 can be routed directly to the combustor 108. In some embodiments, the compressed air from the compressor 106 may be stored in a volume within the compressor 106 (e.g., a crankcase) and released to the combustor 108 as needed. In some embodiments, the compressed air may be transferred directly to the storage system 130. In other embodiments, the compressed air may be stored in a volume within the compressor 106 and directed to the storage system 130 as needed. In some embodiments, the compressed air stored in a volume within the compressor may be stored at a constant pressure. In some embodiments, the compressor maintains the compressed air stored in a volume within the compressor at a constant pressure.

In an embodiment, the compressor 106 may provide an output to drive other elements such as a generator 112, a water pump 114, and a fuel pump 116. In some embodiments, the generator 112, the water pump 114, and the fuel pump 116 may form part of other sub-systems of the powerplant, for example, an electrical or control sub-system 118, a cooling/heating sub-system 120, or a fuel sub-system 122, respectively.

Referring briefly to sub-systems 118, 120, and 122. In an embodiment, an electrical or control sub-system 118 can include a battery, an electric heating system (e.g., to heat the block 228 or to provide heating for a cabin) and a generator (i.e., generator 112). It will be noted that, in some embodiments, the propulsion system 100 may require significantly less parts and components than an internal combustion powerplant ("ICP") having similar performance characteristics. As such, in those embodiments, traditional elements may be comparatively smaller or have significantly less performance characteristics that those in comparable ICPs. For example, in an embodiment, the propulsion system 100 may not require an electric starter thus, a battery of the electrical or control sub-system 118 may have a storage capacity of only a few amp-hours (e.g., 3-5 Ah). For reference, a typical car battery has storage capacity of 50 Ah, while a typical single-engine aircraft battery has a capacity of 11 Ah.

In some embodiments, control sub-system 118 may include processors, computing hardware, sensors (i.e., temperature and pressure sensors), and control devices that may control the several valves, the combustor, the fuel subsystem, and other sub-systems of the propulsion system 100. In some other embodiments, electrical or control sub-system 118 can include hardware to control other vehicle systems such as lights, relays, locks, and vehicle controls. In some other embodiments, electrical or control sub-system 118 can control vehicle functions (e.g., lights, doors) using coded signals from an onboard computer with a single heavy looping positive line and short connectors with smart terminals.

In an embodiment, cooling/heating sub-system 120 may provide cooling or heating functionality using a fluid (e.g., water). In some embodiments, cooling/heating sub-system 120 can provide cooling for at least one of the drive turbine 102, the gearbox 104, and the compressor 106. In some embodiments, cooling/heating sub-system 120 may include water pumps, reservoirs, and radiators. In an embodiment, to heat an aircraft or car cabin the cooling/heating sub-system 120 may include a small radiator in the cabin.

In an embodiment, the fuel sub-system 122 may provide fuel to the combustor 108 using, for example, fuel pump 116. In some embodiments, fuel sub-system 122 may include fuel injectors disposed in the combustor 108 to deliver fuel from a fuel tank via the fuel pump 116. In some embodiments, the fuel flow rate or the fuel pressure in the injectors or the fuel pump 116 may be determined by a predetermined operating turbine inlet pressure and temperature.

In an embodiment, the combustor 108 may mix the compressed air with vaporized fuel to sustain a combustion. In an embodiment, the combustor 108 can include means (e.g., vanes and nozzles) to direct fuel inside a combustion chamber (e.g., combustion chamber 243) to sustain a staged substantially homogeneous combustion. In some embodiments, the combustion may be initiated by igniting the air/fuel mixture using an igniter 124. In an embodiment, the igniter 124 can be a hot wire igniter connected to the electrical system 118. In some embodiments, the fuel may be directed from a reservoir or tank to the combustor by the pump 116 as part of the fuel system 122.

As noted above, in an embodiment the hot exhaust gasses from the combustor 108 may be directed towards the drive turbine 102 and the CEG storage system 130. In some embodiments, the hot exhaust gasses may be cooled prior to reaching the CEG storage system 130. In those embodiments, the hot exhaust gasses may be routed through a thermal storage 126. The thermal storage 126 captures the thermal energy of the exhaust gasses and may route the resulting cooled exhaust gas to the CEG storage system 130. In some embodiments, the process of capturing the thermal energy from the exhaust gasses may produce water from condensation. The water may be drained through drain 128 or may directed towards the cooling/heating sub-system 120. In some embodiments, condensed water collected at drain 128 can be used for life support systems such as lavatories or to be converted to potable water.

In an embodiment, the thermal storage 126 may include a ceramic honeycomb element with a large surface area to capture and store the thermal energy from the exhaust gasses. In some embodiments, when the exhaust gasses from the combustor are routed to the thermal storage 126, the portion of the ceramic honeycomb closest to the exhaust gasses may be heated to high temperatures and, as the exhaust gasses propagate through the honeycomb element, the temperature of the gasses may drop until an appropriate or desired temperature (e.g., ambient temperature) is reached before being directed to the CEG storage system 130. This thermal profile is sometimes known as an S-shaped temperature profile. In some embodiments, during operation, air from the CEG storage system 130 can be directed to the drive turbine 102 through the thermal storage 126. As the air propagates through the thermal storage 126 the cooled exhaust gas may be heated to the necessary temperature.

In some embodiments, as cooled exhaust gas accumulates in the CEG storage system 130 the pressure in the CEG storage system 130 and the thermal storage 126 rises and heat accumulates in the honeycomb element. As will be noted, in some embodiments, the honeycomb element may contain no active heating components, as such, after a period of time (e.g., the vehicle is parked overnight) the heat in the honeycomb may totally or partially dissipate.

In an embodiment, where the propulsion system 100 has been at rest for a prolonged period of time, the air stored in the CEG storage system 130 can be directed towards the drive turbine 102 to start the powerplant. In some embodiments, the cooled exhaust gas may incur a temperature increase by picking up heat from the ambient. In some embodiments, the CEG storage system 130 may hold a total volume sufficient to sustain repeated start sequences. In some embodiments, after the initial start process, exhaust gasses from the combustor 108 can be directed through the thermal storage 126 to restore the thermal profile (i.e., heat the honeycomb element). In some embodiments, the cool gas from the CEG storage system 130 can be used to drive the vehicle prior to starting combustion in the combustor 108. In some embodiments, over-heating of the honeycomb element can be prevented by directing air to the CEG storage system 130 from an internal volume of the compressor 106 to maintain a desired thermal profile of the honeycomb element of the thermal storage 126.

In an embodiment, the CEG storage system 130 can include distributed structural gas storage tank(s) 132, main shutoff valve 134, and partitioning valves 136. Flow to and from the tanks 132 may be controlled by the main shutoff valve 134. Partitioning valves 136 may allow for the discrete allocation of air among the several tanks 132. In some embodiments, CEG storage system 130 comprises only one tank 132. In other embodiments, the CEG storage system 130 may include multiple tanks 132. Still, in some other embodiments, multiple tanks 132 may be partitioned by valves 136. In some embodiments, CEG storage system 130 can include an accessory output port 140 controlled by an accessory output valve 138. In some embodiments, the accessory port 140 can allow compressed air from CEG storage system 130 to power external accessories—for instance, pneumatic tools. In other embodiments, output port 140 can allow CEG storage system 130 to receive compressed air from external sources. The propulsion system 100 may use the received compressed air for any purpose including to start the powerplant 101.

In an embodiment, the CEG storage system 130 may be distributed throughout a vehicle. For example, in some embodiments, some of the tanks 132 may be disposed within a front bumper of a car while the remaining tanks may be disposed in a rear bumper of the car. In other embodiments, the tanks 132 may be disposed within hinged canards or overhead spaces in an aircraft. In some other embodiments, some of the tanks 132 are part of a tubular frame of the vehicle. In other embodiments, the vehicle comprises a tubular frame and cooled exhaust gasses are stored within the tubular frame.

Figure 2:
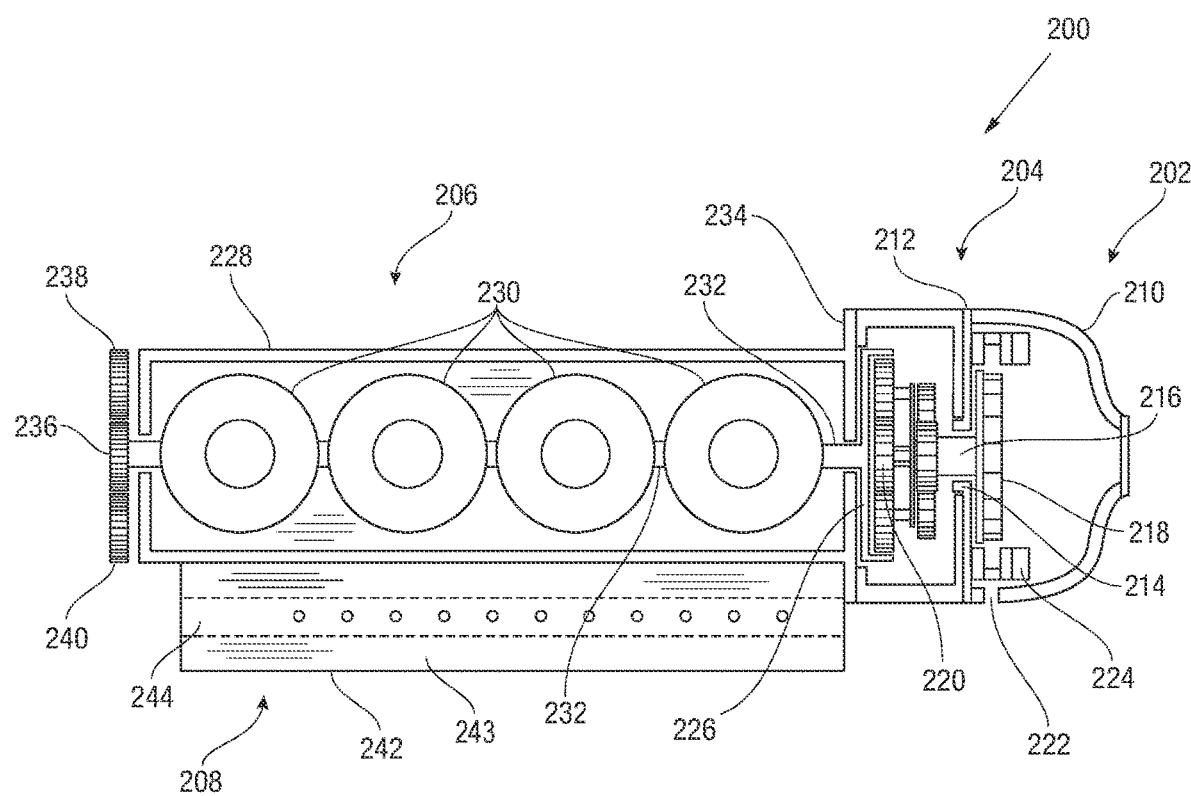
FIG. 2 is a top view of a propulsion system according to an embodiment of the present invention.

Turning now to FIG. 2, a drive turbine 202, gearbox 204, compressor 206, and combustor 208 of a powerplant 200 according to embodiments of the present invention, are shown. In an embodiment, drive turbine 202 may include a housing 210 secured to a mounting plate 212, the mounting plate 212 further secured to the gearbox 204. In some embodiments, the mounting plate 212 may be manufactured out of or comprises an insulating material to prevent heat from the drive turbine 202 to transfer to the gearbox 204. In some embodiments a heat insulating material or heat shield may be disposed between the drive turbine 202 and the gearbox 204 to prevent heat transference from the turbine to the gearbox.

In an embodiment, the drive turbine 202 may include a bearing tube 214 holding turbine rotor 216. The turbine rotor 216 may have an impeller 218 disposed on the turbine side and a sun gear 220 on the gearbox 204 side. The impeller 218 may be disposed within the housing 210. In some embodiments, hot gasses from the combustor 208 may enter the turbine housing 210 through inlet 222. In some embodiments, the hot gasses may enter the housing 210 through a nozzle at inlet 222. In some embodiments, housing 210 can have multiple inlets 222 and multiple nozzles disposed in the inlets 222 disposed around a circumference of the housing 210. The impeller 218 may be turned as the hot gasses enter the housing 210 and expand.

In some embodiments, the flow of hot gasses through the nozzles may be controlled by a mating castle ring 224. In an embodiment, during operation, an operator of a vehicle powered by the powerplant 200 may act, either directly, through mechanical linkages, or through electronic controls, upon the ring 224 to control the output of the powerplant 200 and, therefore, control movement of the vehicle.

As mentioned above, the rotor 216 extends from the drive turbine 202 to the gearbox 204. The rotor 216 has a sun gear 220 which may be a sun gear of a planetary or epicyclic gear of gearbox 204. A ring gear 226 of the planetary gear of gearbox 204 may extend into the compressor 206. Gearbox 204 will be discussed in further detail with respect to FIGS. 3 and 4 below.

The compressor 206 comprises a block 228 which holds cylinders 230 and crankshaft 232. In some embodiments, the block 228 may comprise a sealed crankcase portion, a cylinder portion and a cover, illustrated in FIGS. 5 and 6. In some embodiments, cylinders 230 may be wet cylinders. In some embodiments, cylinders 230 may be dry cylinders (e.g., air-cooled cylinders).

In some embodiments, where no combustion occurs in the cylinders 230 of block 228, the block 228 requires comparatively less cooling than internal combustion engines with similar cylinder count and configuration. In some embodiments, the block 228 can have an inline four configuration. In some embodiments, the block 228 can be water cooled at least in part by a cooling heating system similar to the cooling/heating sub-system 120 described with respect to FIG. 1. In some embodiments, the external surfaces of the block 228 can allow for air cooling of the compressor 206. In some embodiments, where the propulsion system may experience freezing temperatures, the block 228 may be heated by an electric heater or blanket or by routing hot exhaust gasses around the block 228.

In some embodiments, the compressor 206 includes a mounting plate 234 for attaching the gearbox 204 to the block 228 of the compressor 206. In some embodiments, the crankshaft 232 comprises the ring gear 226 of the planetary gear of gearbox 204 on one end and a gear 236 on the other end. In some embodiments, gear 236 drives a water pump (e.g., water pump 114 of the cooling/heating system 120). In some embodiments, gear 236 mates with gear 238 to drive an electric generator (e.g., generator 112 of the electrical or control sub-system 118). In some embodiments, gear 236 mates with gear 240 to drive a fuel pump (e.g., fuel pump 116 of fuel sub-system 122).

In some embodiments, the combustor 208 may be part of the block 228. In other embodiments, the combustor 208 may be separate from the block 228. In an embodiment, combustor 208 comprises an insulated housing 242, a combustion chamber 243, and a perforated tube reactor 244. The perforated tube reactor 244 may be disposed within the insulated housing 242. During operation, fuel can be directed through the perforated tube reactor 244 into the combustion chamber. In some embodiments, an igniter (not shown) ignites the air/fuel mixture to initiate combustion. In some other embodiments, no igniter is required, and the mixture may combust after reaching a certain temperature or pressure. In some embodiments, the perforated ceramic tube reactor 244 can hold static mixing vanes or catalysts, if needed.

Figure 3A:
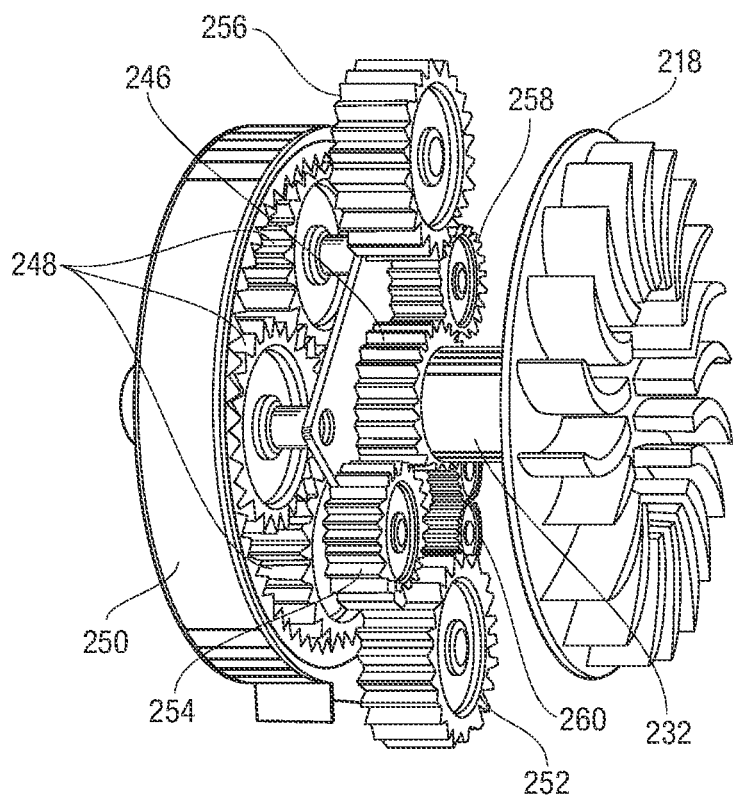
FIG. 3A is a right isometric detail view of the gearbox of FIG. 2, according to an embodiment of the present invention.
Figure 3B:
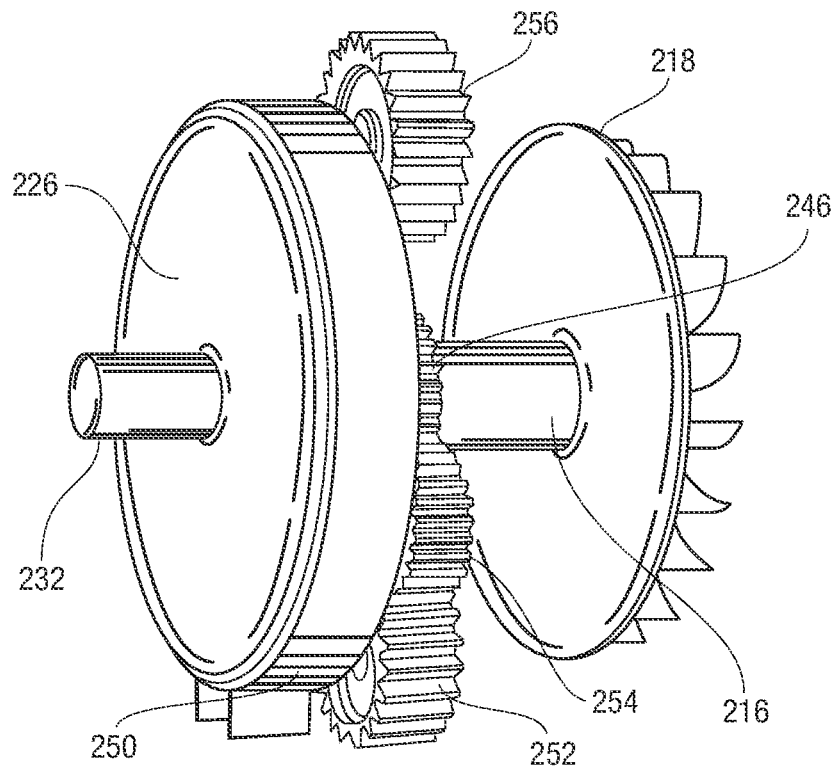
FIG. 3B is a left isometric detail view of the gearbox of FIG. 2, according to an embodiment of the present invention.

Turning now to FIGS. 3A and 3B, right and left isometric detail views, respectively, of a gearbox 204 according to an embodiment of the present invention are shown. As noted above, the turbine rotor 216 has impellers 218 at one end and sun gear 220 in the other. The sun gear 220 mates to the planetary gears 248, which in turn mate to the ring gear 226 of the crankshaft 232. In an embodiment, a brake 250 envelops an outer surface of the ring gear 226. During operations, the brake 250 holds the ring gear 226 in place to, for example, place the compressor 206 in a state of rest. It will be noted that brake 250 is representative of means to immobilize the ring gear 226. In some embodiment, an implementation of a disk brake disposed around the crankshaft 232 can achieve the same effect as brake 250. In other embodiments, an electromagnetic brake may allow for engagement of the ring gear 226 with an electromechanical system (e.g., a generator) to stop the ring gear 226 from rotating.

In some embodiments, a carrier gear 246 may be disposed around but rotates independently of the rotor 216. In some embodiments, the carrier gear 246 may be mechanically connected to the planetary gears 248. In some embodiments, the carrier gear 246 may engage with the output gear 252 through connector gear 254. In some embodiments, to achieve reverse rotation of the output gear 252, the carrier gear 246 may engage with output gear 252 through the set of reverse gears 260. In other embodiments, the carrier gear 246 may engage with the output gear 256 through connector gear 258. Though not shown, in some embodiments, output gear 256 can achieve reverse rotation through a set of reverse gears.

Figure 4A:
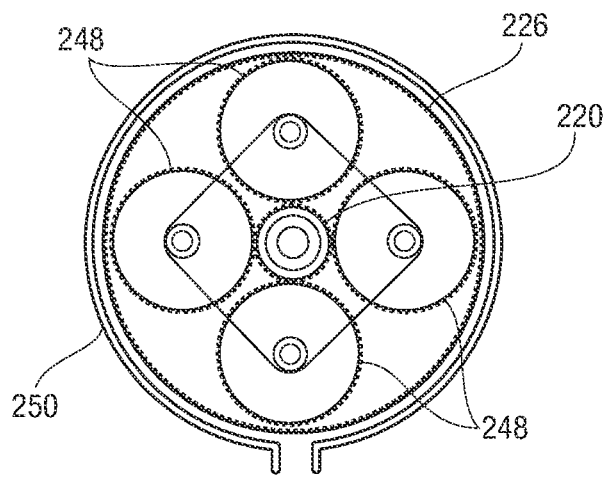
FIG. 4A is a right detail view of the gearbox of FIG. 2, according to an embodiment of the present invention.
Figure 4B:
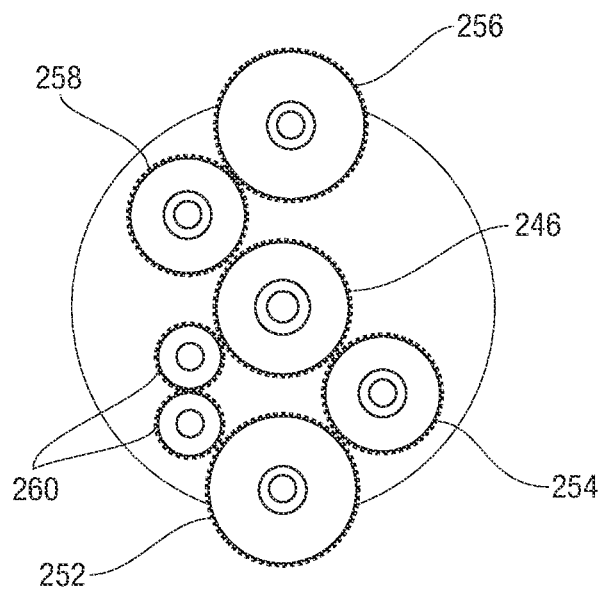
FIG. 4B is a left detail view of the gearbox of FIG. 2, according to an embodiment of the present invention.

FIGS. 4A and 4B, illustrated right and left detail views, respectively, of a gearbox 204 according to an embodiment of the present invention. As will be noted, power from the drive turbine 202 can be routed differently depending on the requirement or the process being performed. Generally, power from drive turbine 202 can be directed to the ring gear 226, the carrier gear 246 or both simultaneously. The carrier gear 246, in turn, may provide power to output gears 252 and 256, according to some embodiments.

In some embodiments, power from the drive turbine 202 may be routed solely to the compressor 206 by preventing movement of the carrier gear 246. In some embodiments, depending on the configuration, movement of the carrier gear 246 may be prevented by preventing movement of output gear 252, output gear 256, or both. For example, in embodiments where output gear 252 is coupled to the wheels of a vehicle, applying the brake on the vehicle can prevent the output gear 252 from turning and, therefore, carrier gear 246 may also be prevented from turning. In that case, power from the drive turbine 202 can be transmitted in its entirety to the compressor 206 through the ring gear 226.

In some embodiments, power from the drive turbine 202 can be routed to the output gear 252, output gear 256, or both by applying brake 250 to the ring gear 226 and preventing the ring gear from moving. In those embodiments, the compressor 206 may be put at rest and the full power of the turbine may then be used for propelling the vehicle.

In some embodiments, for example where the vehicle is an automobile, gearbox 204 may only provide for output gear 252. The output gear 252 can be coupled to the drive wheels of the vehicle using traditional methods (i.e., a transmission, transfer case). In other embodiments, for example where the vehicle is an aircraft, gearbox 204 may only provide for output gear 256. The output gear 256 can then be coupled to a propeller or propellers of the aircraft using traditional methods (i.e., a transmission, transfer case). In still other embodiments, for example where the vehicle has more than one system to propel the vehicle (e.g., both a car and an aircraft), gearbox 204 may provide for output gear 252 and output gear 256. The output gear 252 may be coupled to the drive wheels while the output gear 256 may be coupled to the propeller. As noted above, other traditional elements, such as transmissions, differentials, or transfer cases may be used in addition to the embodiments described herein.

In some embodiments, for example where the vehicle is a car, to effect a traditional parked state both connector gear 254 and reverse gears 260 may be engaged to prevent movement of the vehicle. In other embodiments, to tow the car, both connector gear 254 and reverse gears 260 may be disengaged thereby disconnecting the wheels from the powerplant. In some embodiments, for example where the vehicle is an aircraft, both, connector gear 254 and connector gear 258, may be engaged during takeoff to power the wheels and at least one propeller. During landing, a traditional wheel braking system may slow the aircraft and connector gear 258 may be disengaged to propel the vehicle only through the wheels. In some embodiments, the vehicle may also be able to float on water (for example by inflating side pods attached to and stored within the vehicle when not used). In those embodiments, the vehicle may use a traditional boat propeller connected to one of the output gears. In some embodiments, gearbox 204 may provide additional outputs connected to carrier gear 246 to drive multiple sources of propulsion.

Figure 5:
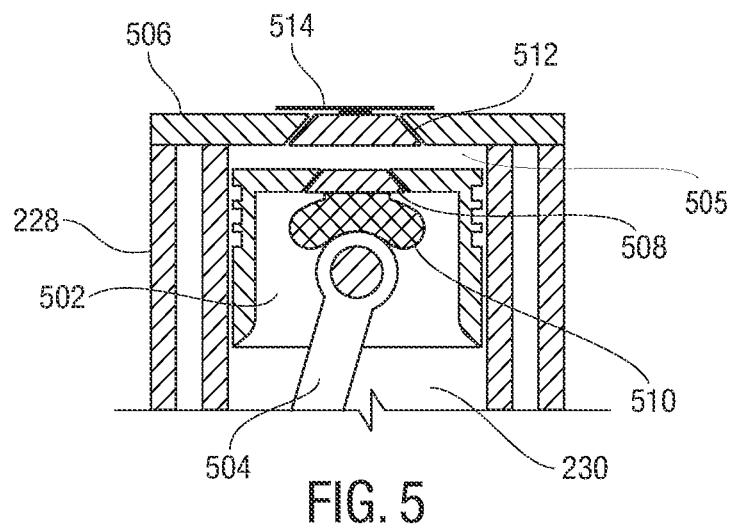
FIG. 5 is a section view of an exemplary cylinder and piston of a compressor, according to an embodiment of the present invention.

Turning now to FIG. 5, a section view of an exemplary cylinder and piston of a compressor, according to an embodiment of the present invention, is shown. In an embodiment, the piston 502 may be disposed within cylinder 230. In some embodiments, a portion of the cylinder 230 (e.g., between the piston head and the crankcase) is in fluid connection with the crankcase of the block 228. In some other embodiments, the piston 502 may be connected to the crankshaft 232 by connecting rod 504. In still some other embodiments, the cylinder may be covered by a cylinder head 506 secured to the block 228. In some embodiments, the cylinder head 506 may include at least one intake valve 512 per cylinder. In some embodiments, the intake valves 512 can be spring-loaded tapered disk valves by, for example, biased member 514. In some embodiments, the head of piston 502 may be a flat head including a valve 508. In an embodiment, the valve 508 can be a tapered disk valve. In some embodiments, the valve 508 may be held against the piston head by biased member 510.

In some embodiments, during operation, a cylinder 230 of the compressor 206 can compress air by drawing ambient air during the down stroke through the valve 512. During the up stroke, the valve 512 may close and once a desired pressure differential between the compression chamber and the crankcase is achieved within the compression chamber 505, valve 508 may open by overcoming a force from biased member 510. Then, the compressed air from the compression chamber may be directed to the crankcase for storage. In some embodiments, at least one of the valve 512 and valve 508 may be electronically controlled as part of electrical or control sub-system 118. As noted above the compressed air from the crankcase can also be directed as needed or continuously to combustor 208.

Figure 6:
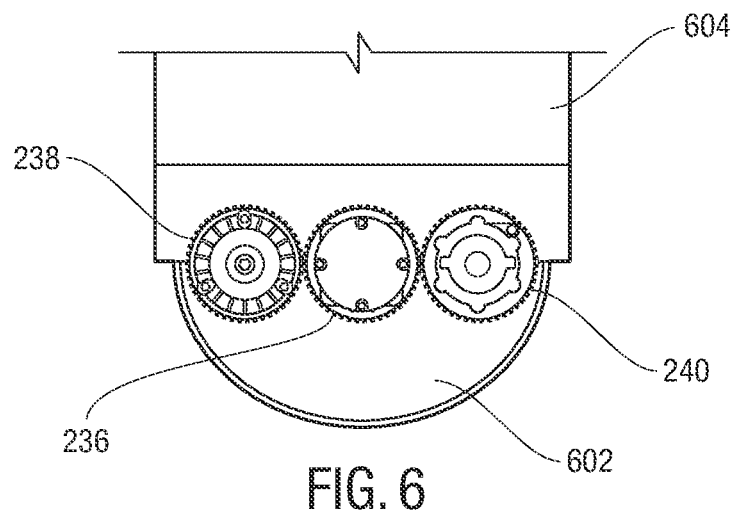
FIG. 6 is a back view of the compressor of FIG. 2, according to an embodiment of the present invention.

Referring now to FIG. 6, a partial back view of the compressor of FIG. 2, according to an embodiment of the present invention, is shown. As noted herein, the block 228 may include a crankcase 602 and a cylinder head 604. As further noted herein, the gear 236 may be connected to the crankshaft 232. In some embodiments, gear 236 may drive at least one of a water pump 114, an electric generator 112, and a fuel pump 116. In an embodiment, gear 236 can be directly connected to a permanent magnet, the permanent magnet may be surrounded by coils of a stator as part of an electric generator; as gear 236 turns, an electric current is induced in the coils.

In the following description, reference will be made to elements disclosed with respect to the different figures. However, the following is not intended to be limiting in any respect and is intended instead, to illustrate some of the functionality of the several elements. As referenced throughout this disclosure, propulsion systems described herein may be configured differently depending on the type of operation being performed or the ultimate state to be achieved. For example, in some embodiments, an ICP may be configured differently for a start state, an operational state, a shutdown state, or a rest state.

In some embodiments, prior to a start state, compressed air from an outside source is directed to a cooled exhaust gas storage system (e.g., CEG storage system 130) through a port (e.g., accessory output port 140) to fill a tank or tanks (e.g., tanks 132) of the storage system. In some embodiments, prior to the start state, compressed air may be stored in a crankcase of a compressor (e.g., compressor 106). In some embodiments, during a startup process of the startup state, compressed air from the storage system, an outside source, or the crankcase of the compressor may be directed to a turbine (e.g., drive turbine 102) through a thermal store (e.g., thermal storage 126) via a valve. An impeller (e.g., impeller 218) of the turbine connected to a gearbox (e.g., gearbox 104) may be rotated by the expanding compressed air. In turn, the gearbox may transmit power from the turbine to the compressor. The compressor takes in ambient air and compresses it. In some embodiments, the compressed air may be directed to a combustor (e.g., combustor 108). In other embodiments, the compressed air may be stored in a storage volume within the compressor prior to being released to the combustor. In some embodiments, the combustor mixes the received compressed air and fuel supplied by a fuel pump (e.g., fuel pump 116) to initiate a combustion within a combustion chamber (e.g., combustion chamber 243). In some embodiments, once a combustion has reached a stable state or a desired pressure or temperature is reached, the valve may be switched to direct exhaust gasses from the combustor to the turbine. In other embodiments, the exhaust gasses may be directed to both the turbine and the storage system by the valve.

In an embodiment, an operational state is initiated and sustained once a stable combustion is achieved in the combustor and the exhaust gasses continuously flow to the turbine completing the cycle. In some embodiments, an operator of a vehicle comprising the propulsion system may vary the performance characteristics of the propulsion system (e.g., acceleration) by restricting the flow of exhaust gasses to the turbine using a mating castle ring (e.g., mating castle ring 224) to modulate the output of a nozzle of the turbine. The operational state may continue until a shutdown process of a shutdown state is initiated.

In an embodiment, a shutdown process of a shutdown state is initiated by partially or totally stalling the turbine. In some embodiments, stalling the turbine includes restricting flow to the turbine. The exhaust gasses may be directed to the storage system to fill the tanks or maintain a desired pressure in the tanks, the combustor, and the turbine. In other embodiments, stalling the turbine includes mechanically slowing or stopping rotation of the impeller. In some embodiments, the shutdown state is initiated by extinguishing the combustion in the combustor (i.e., by depriving the combustor of fuel, air, or both). In some embodiment, the shutdown state ends when no combustion is occurring in the combustor or the turbine has stopped operating.

In an embodiment, once the shutdown state is achieved the propulsion system enters a rest state. In some embodiments, in a rest state, the propulsion system may not produce any power. In other embodiments, in a rest state, some elements or sub-systems of the propulsion system may be energized or operational while others may not.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle or mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A propulsion system for powering a vehicle, the propulsion system comprising:
    a powerplant having:
        a combustor for sustaining a combustion of an air/fuel mixture and generating hot exhaust gasses therefrom;
        a turbine in fluid communication with the combustor, the turbine including a turbine rotor configured to move by expanding hot exhaust gasses; and
        a compressor for compressing ambient air, the compressor mechanically connected to the turbine by a gearbox and fluidly connected to the combustor to deliver a portion of the compressed air to the combustor, the compressor having a sealed crankcase for storing at least a portion of the compressed air; and
    an exhaust gas storage system for cooling and storing at least a portion of the hot exhaust gasses from the combustor.

2. The propulsion system of claim 1, wherein the combustor further comprises a two-stage perforated tube reactor.

3. The propulsion system of claim 1, wherein the compressor further comprises a piston with a valve for directing compressed air from a compression chamber to the crankcase.

4. The propulsion system of claim 1, wherein the exhaust gas storage system further comprises a thermal storage, designed to capture thermal energy from the exhaust gasses.

5. The propulsion system of claim 4, wherein the thermal storage further comprises a ceramic honeycomb element.

6. The propulsion system of claim 1, wherein the exhaust gas storage system further comprises storage tanks distributed throughout the vehicle.

7. The propulsion system of claim 6, wherein the vehicle comprises a tubular frame and the storage tanks are part of the tubular frame.

8. The propulsion system of claim 1, wherein the gearbox includes a planetary gear.

9. The propulsion system of claim 1, wherein the gearbox further comprises an output shaft to drive wheels of the vehicle.

10. The propulsion system of claim 1, wherein the gearbox further comprises an output shaft to drive a propeller of the vehicle.

11. A method of operating a propulsion system for powering a vehicle, the method comprising:
    providing a propulsion system including a powerplant having a combustor in fluid communication with a turbine, and a compressor mechanically connected to the turbine by a gearbox, the compressor having a sealed crankcase for storing compressed air in fluid communication with the combustor;
    compressing ambient air in the compressor and storing at least a portion of the compressed air in the crankcase;
    generating exhaust gasses by sustaining a combustion in the combustor using at least a portion of the compressed air in the crankcase; and
    driving the drive turbine with at least a portion of the exhaust gasses from the combustor.

12. The method of claim 11, further comprising directing at least a portion of the exhaust gasses from the combustor to an exhaust gas storage system.

13. The method of claim 11, further including providing a thermal storage for capturing thermal energy from the exhaust gasses passing therethrough to cool the exhaust gasses.

14. The method of claim 13, wherein, in the step of providing, the thermal storage further comprises a ceramic honeycomb element designed to capture thermal energy from the exhaust gasses.

15. The method of claim 11, wherein, in the step of providing, the compressor further comprises a piston having a valve to allow compressed air to flow from a compression chamber to the sealed crankcase.

16. The method of claim 11, wherein, in the step of providing, the gearbox includes a planetary gear.

17. The method of claim 11, wherein, in the step of providing, the gearbox further comprises an output shaft to drive wheels of the vehicle.

18. The method of claim 11, wherein, in the step of providing, the gearbox further comprises an output shaft to drive a propeller of the vehicle.

* * * * *